United States Patent

Appleton et al.

[15] 3,639,793
[45] Feb. 1, 1972

[54] SUPERCONDUCTING HOMOPOLAR DYNAMOELECTRIC MACHINES

[72] Inventors: Anthony Derek Appleton; Michael Burke Wood; Brian Edward Mulhall, all of Fossway, Newcastle upon Tyne 6, England

[22] Filed: June 1, 1970

[21] Appl. No.: 42,040

[30] Foreign Application Priority Data

June 2, 1969   Great Britain ..................... 27,863/69

[52] U.S. Cl. ............................................. 310/178, 310/10
[51] Int. Cl. ..................................................... H02k 31/00
[58] Field of Search ................................. 310/178, 10, 54

[56] References Cited

UNITED STATES PATENTS 3,539,852   11/1970   Appleton et al. ........................ 310/178
900,771   10/1908   Noeggerath ............................. 310/178

FOREIGN PATENTS OR APPLICATIONS 61,654   11/1923   Sweden .................................... 310/178

Primary Examiner—D. X. Sliney
Attorney—Kemon, Palmer & Estabrook

[57] ABSTRACT

A homopolar machine having a superconducting annular field coil within which is mounted a rotor having a conductor assembly consisting of a single frustoconical conductor or a group of conductors in a frustoconical array, the outer end of the conductor assembly being located in the region of high field strength immediately within the field coil and the inner end of the conductor assembly being thus displaced axially away from the center of the coil into a region of low field strength whereby the provision of current transfer surfaces of small diameter and large axial extent with the risk of large circulating currents can be avoided.

12 Claims, 3 Drawing Figures

SUPERCONDUCTING HOMOPOLAR DYNAMOELECTRIC MACHINES

This invention relates to superconducting homopolar dynamoelectric machines.

A superconducting homopolar machine with a disc-type rotor is described in our British Pat. No. 1,133,724 in which the disc-type rotor rotates in a magnetic field produced by a superconducting coil located in a cryostat surrounding but not enclosing the rotor. In one embodiment the rotor is in the form of a solid disc while in an alternative embodiment the rotor is in the form of a number of radial conducting paths located on a support disc. Current transfer means are located at the periphery of the rotor and near its axis of rotation to transfer current between the rotor and an external circuit. In a typical case sliprings are located at the periphery of the disc and at an inner radius and brushes are arranged to contact the sliprings.

In machines of the type described where the operating currents are high, the area of contact surface between the inner slipring and brushes must be large and this requirement, coupled with the requirement that the inner slipring radius must be as small as possible to make maximum use of the magnetic field flux cut by the rotor conductor or conductors, leads to the adoption of inner sliprings of substantial axial length. Losses due to circulating currents can occur at the current transfer surfaces due to the slipring surface being cut by the magnetic field, however, and it is difficult and costly to profile the long inner slipring surface to minimize these losses in the manner described in copending application Ser. No. 851,682 filed on Aug. 20, 1969.

In accordance with the present invention there is provided a homopolar dynamoelectric machine having a superconducting field winding in the form of an annular field coil, a rotor mounted coaxially within the field coil, and means for transferring current between a conducting path or paths on the rotor and an external circuit, wherein the said conducting path or paths extend between a radially outer end disposed axially within the field coil and a radially inner end axially spaced from the outer end.

The outer end preferably lies on a circle centered on the rotor axis and lying in the principal plane of the field coil while the inner end, which is of smaller radius, lies in a plane normal to the rotor axis but axially spaced from the said principal plane and preferably axially outside the coil.

The conducting path on the rotor may be a continuous frustoconical shell, analogous to the disc of a disc-type machine. Alternatively a plurality of conducting paths may be formed by segments of a frustoconical shell which are bolted or joined together, while being insulated from each other, to form a segmented rotor analogous to those described in our British Pat. specification No. 1,181,821. The segments preferably extend in the direction of the generatrix of the conical surface, that is to say along straight paths which, if extended, would all intersect the cone axis at the same point. The frustoconical shell, whether segmented or not, can be self-supporting or be mounted on a nonconducting support.

In a further alternative construction the individual conducting paths can be straight bars of rectangular or other section, tapering along their length if required, instead of being segments of a frustoconical shell. These bars can be arranged in a frustoconical array.

The support for the conducting paths can be of hollow frustoconical form with the conducting paths on the inner surface, provision being made for connecting the conducting paths to current transfer means on the outside of the support.

Two frustoconical conductor assemblies, each of which may comprise a continuous or segmented shell or an array of conductor bars, can be arranged on the rotor base to base with a single field coil surrounding the juxtaposed bases and providing the magnetic field for the two conductor assemblies. Two such double cones, each with its own field coil, can be arranged end to end to a common rotor.

In a further embodiment of the invention a frustoconical conductor assembly is placed with its base adjacent one end of a drum-shaped conductor assembly using the same field coil, thus forming a combined drum and cone machine. A second frustoconical conductor assembly can be mounted with its base adjacent the other end of the drum assembly and a second field coil can be arranged around the said other end to cooperate with the first field coil in proving the field for the drum assembly.

The current transfer means may be of the solid contact type, for example comprising brushes and sliprings, or of the liquid contact type, for example comprising a solid contact cooperating with a mercury contact.

One form of the present invention will now be described by way of example with reference to the accompanying drawing, which shows a vertical half section through a homopolar dynamoelectric machine in accordance with the invention, taken on a plane including the rotor axis.

Figure 1:
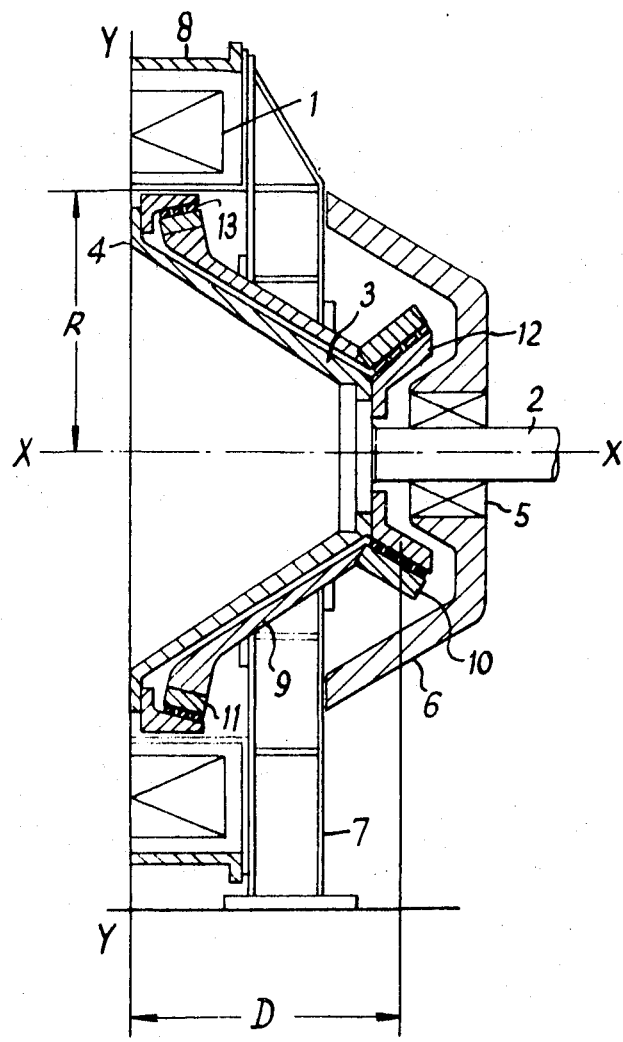
FIG. 1 is a partial longitudinal section of the right half of a machine in accordance with the invention.
Figure 2:
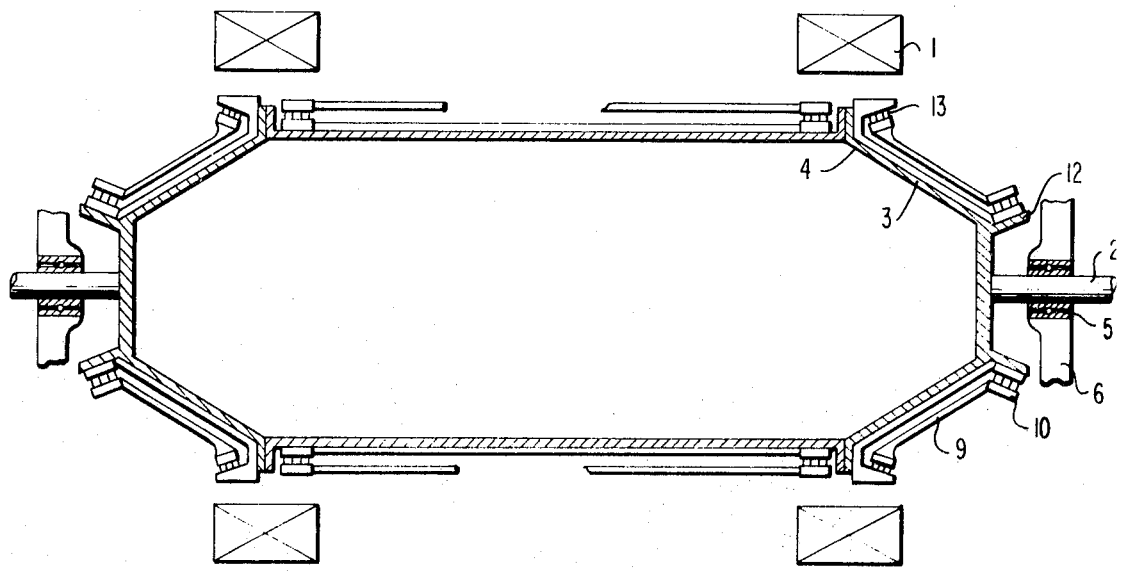
FIG. 2 is a schematic longitudinal section of a modification in which the two halves of a machine according to FIG. 1 are combined with a drum-type homopolar unit.

Referring to the drawing, the machine shown in FIG. 1, which may operate as a generator or a motor, comprises a superconducting stator field coil 1 of annular shape disposed coaxial with the rotor axis X—X of the machine and surrounding a rotor comprising two stub shafts and two frustoconical-shaped conductor assemblies disposed base-to-base. Only the right-hand half of the machine is shown in section in the drawing, the other half being a mirror image about the plane Y—Y, and hence only one stub-shaft 2 and rotor conductor assembly 3 are visible.

The base rings of the two conductor assemblies are formed into flanges 4 to allow them to be bolted base-to-base, the conductor assemblies being insulated from each other by insulating means, not shown. The plane of junction of the base rings is coplanar with the principal plane Y—Y of the coil 1.

Stub-shaft 2 is supported by a bearing 5 held in an end cap 6 which is in turn supported by stator structural members 7. Structural members 7 also provide support for the cryostat vacuum shell 8 surrounding the coil 1 and bear the weight of the coil 1 which is carried within an inner cryostat vessel supported by ties from the shell 8. Members 7 further transmit the machine torque reaction from stationary return conductors 9, shaped similarly to the rotor conductor assembly and forming part of the rotor circuit, to the machine foundations. Conductors 9 carry brushboxes 10 and 11 on their ends.

The frustoconical conductor assembly 3 has cantilevered sliprings 12 and 13 at its radially inner and outer ends, respectively. Each slipring 12 or 13 may be continuous or segmented, according to whether the rotor conductor assembly 3 comprises a single continuous path or is formed of a number of segments providing separate rotor conducting paths. The sliprings preferably have conical surfaces, as shown, so that the lines of flux of the stator magnetic field are generally parallel to them in order to minimize circulating currents.

The arrangement described permits the outer slipring 13 to be positioned in an outer circumferential region of the rotor closely adjacent the principal plane Y—Y of the superconducting field coil, this circumferential region having a radius slightly smaller than the inner radius R of the field coil, and thus allows the outer end of the conductor 3 to move through that portion of the magnetic field produced by the coil 1 which has the highest flux density.

The inner slipring 12 is positioned in an inner circumferential region of the rotor lying in a plane spaced at a distance D from the plane Y—Y and this allows the outer end of conductor 3 to extend to a region of very low magnetic flux density, in particular lower than would be the case for a simple disc rotor conductor. The radius of the inner slipring 12 may be considerably larger than that for a disc rotor, however, and the area of contact surface required between slipring 12 and the brushes which are in contact with it may be correspondingly less, thus reducing the transverse length of slipring surface required and minimizing any losses due to circulating currents which can occur at the slipring to brush interface.

The distance D would be optimized for any particular machine, depending upon the rotor current value, stator field configuration and the desired axial length of the machine, but would typically lie between R and 1.5 R.

Figure 3:
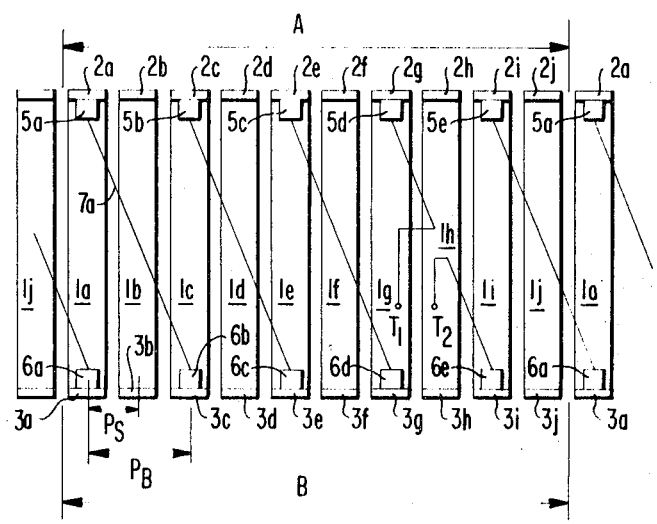
FIG. 3 is a diagram of connections which can be used with machines including those of FIGS. 1 and 2.

In FIG. 3 is shown a developed schematic of rotor conductors 1a to 1j extending from one end A to the other end B of a homopolar machine unit. Stationary conductors such as 7a, as indicated, connect opposite ends of peripherally spaced rotor bars by means of brushes 5a+ and 6a+.

The connections leading from the rotor conductor 3 and the stationary return conductor 9 to the machine terminals, and the terminals themselves, are not shown in the drawing, but such connections may be made between brushboxes 10 and 11 or between a brushbox and return conductor 9.

The rotor circuit of the half of the machine shown in the drawing may be connected electrically in series with the corresponding rotor circuit of the half of the machine not shown.

We claim:

1. An air-cored homopolar dynamoelectric machine comprising a superconducting field winding in the form of an annular field coil, means for maintaining said field coil at superconducting temperatures, a rotor disposed coaxially within said field coil, said rotor comprising at least one conducting path having a radially outer end located axially within said field coil and closely adjacent the inner periphery of said annular field coil and a radially inner end axially spaced from said outer end, and means for transferring current between said conducting path and an external circuit.

2. A homopolar machine as claimed in claim 1 wherein said rotor comprises a plurality of conducting paths having radially outer ends located axially within said field coil and radially inner ends located axially outside said field coil, the said outer ends all lying on a first circle centered on the rotor axis and the said inner ends all lying on a second circle centered on the rotor axis.

3. A homopolar machine as claimed in claim 2 wherein the conducting paths conform to a frustoconical surface.

4. A homopolar machine as claimed in claim 3 in which the conducting paths are formed by segments of a frustoconical member, said segments being secured together by electrically insulating securement means.

5. A homopolar machine as claimed in claim 1 wherein said conducting path is of frustoconical form.

6. A homopolar machine as claimed in claim 1 wherein said current transfer means comprise an outer slipring on said rotor electrically connected to the outer end of the conducting path, an inner slipring on said rotor electrically connected to the inner end of the conducting path, and fixed brushes cooperating with said outer and inner sliprings.

7. A homopolar machine as claimed in claim 6 in which the sliprings have surfaces in contact with the brushes, said surfaces lying parallel to the magnetic field of the field coil to minimize circulating currents in said surfaces.

8. A homopolar machine as claimed in claim 2 comprising an inner and an outer segmented slipring, each conducting path being electrically connected between a respective segment of the inner slipring and a respective segment of the outer slipring, a plurality of first brushes cooperating with said inner slipring and a plurality of second brushes cooperating with said outer slipring and a plurality of nonrotating return conductors each interconnecting one of said first brushes with one of said second brushes to establish a series connection between said conducting paths.

9. A homopolar machine as claimed in claim 1 in which said rotor comprises at least one second conducting path having a radially outer end located adjacent said first-mentioned conducting path and a radially inner end disposed symmetrical with the radially inner end of the first-mentioned conducting path about the plane of the radially outer ends.

10. A monopolar machine as claimed in claim 9 including means connecting the first and second conducting paths in series.

11. A homopolar machine as claimed in claim 2 wherein said rotor comprises a plurality of second conducting paths having radially outer ends located adjacent the radially outer ends of the first conducting paths and radially inner ends lying on a third circle centered on the rotor axis and disposed on the side of the first circle opposite to the second circle.

12. A homopolar machine as claimed in claim 1 wherein said rotor has a drum portion having one end adjacent the radially outer end of said conducting path and the other end remote from the radially inner end of said conducting path, the drum portion carrying at least one further conducting path extending parallel to the axis of the rotor and cooperating with further current transfer means at the ends of the drum portion.

* * * * *